Sept. 21, 1971 M. SPERTUS ET AL 3,606,726
METHOD AND MACHINE FOR MAKING DUNNAGE DEVICES
Filed Aug. 7, 1969 6 Sheets-Sheet 1
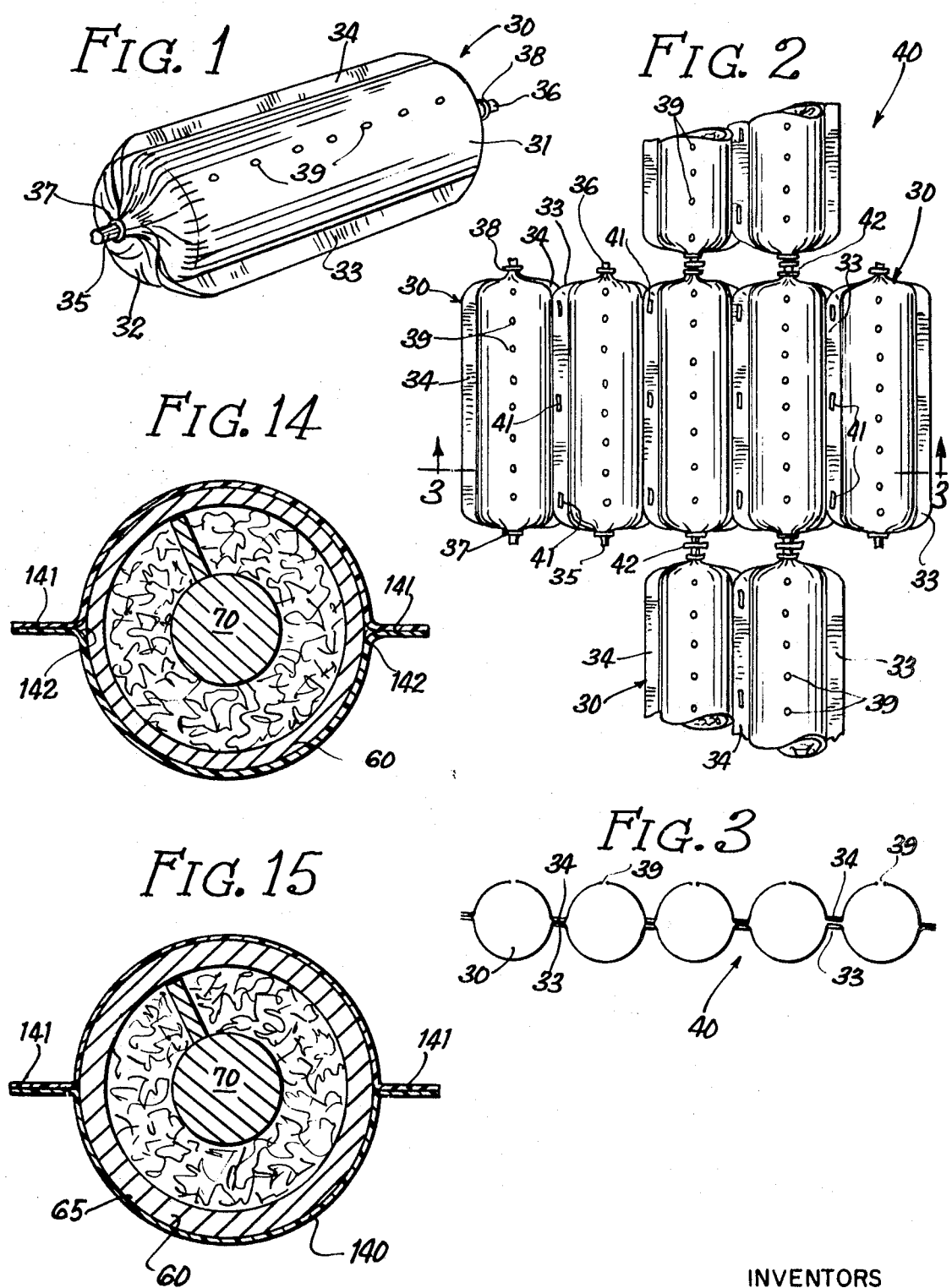
INVENTORS
MAURICE SPERTUS
CHARLES K. GOLDBERG.
by Prangley, Clayton, Mullin, Dithmar & Vogel.
Att'ys

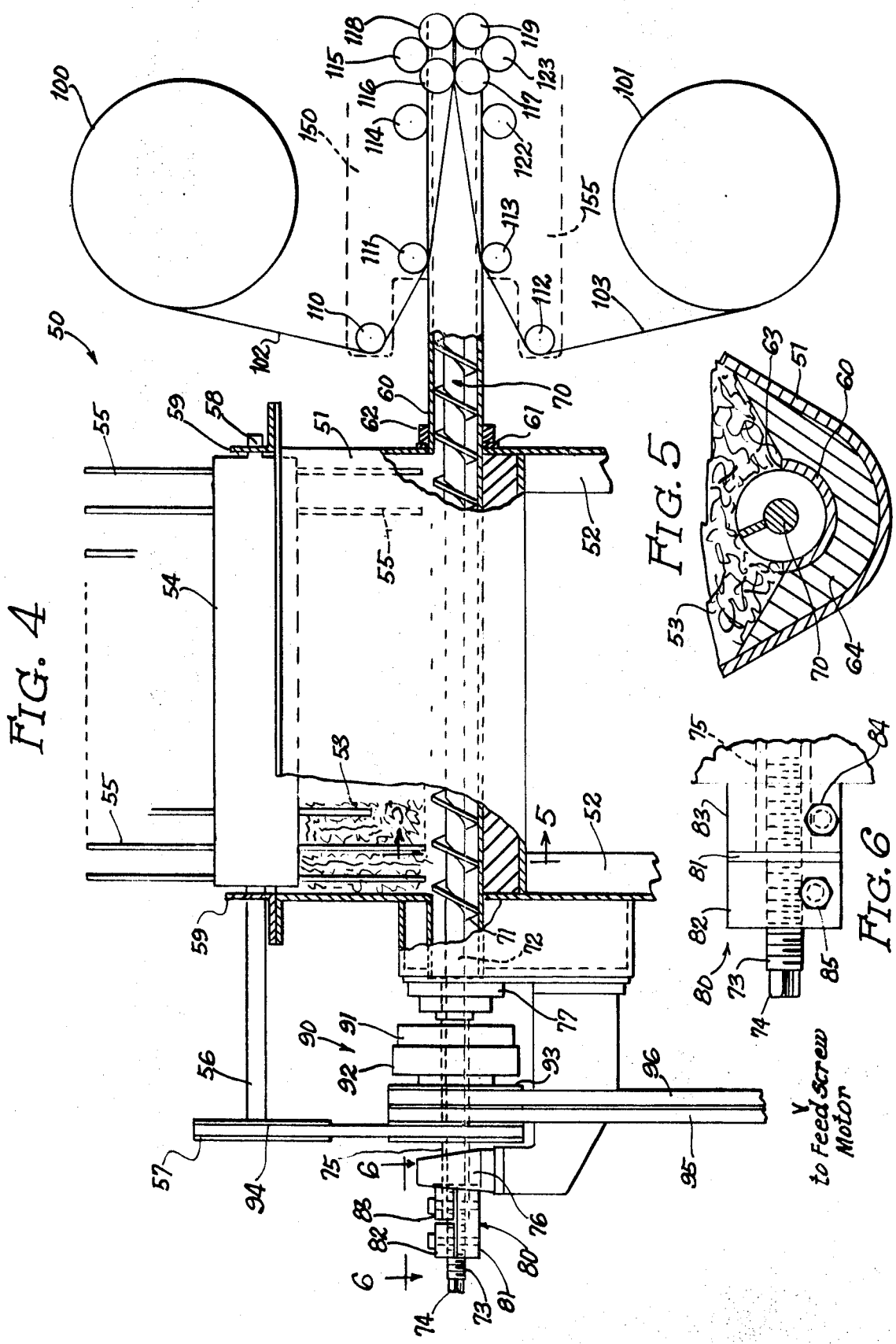

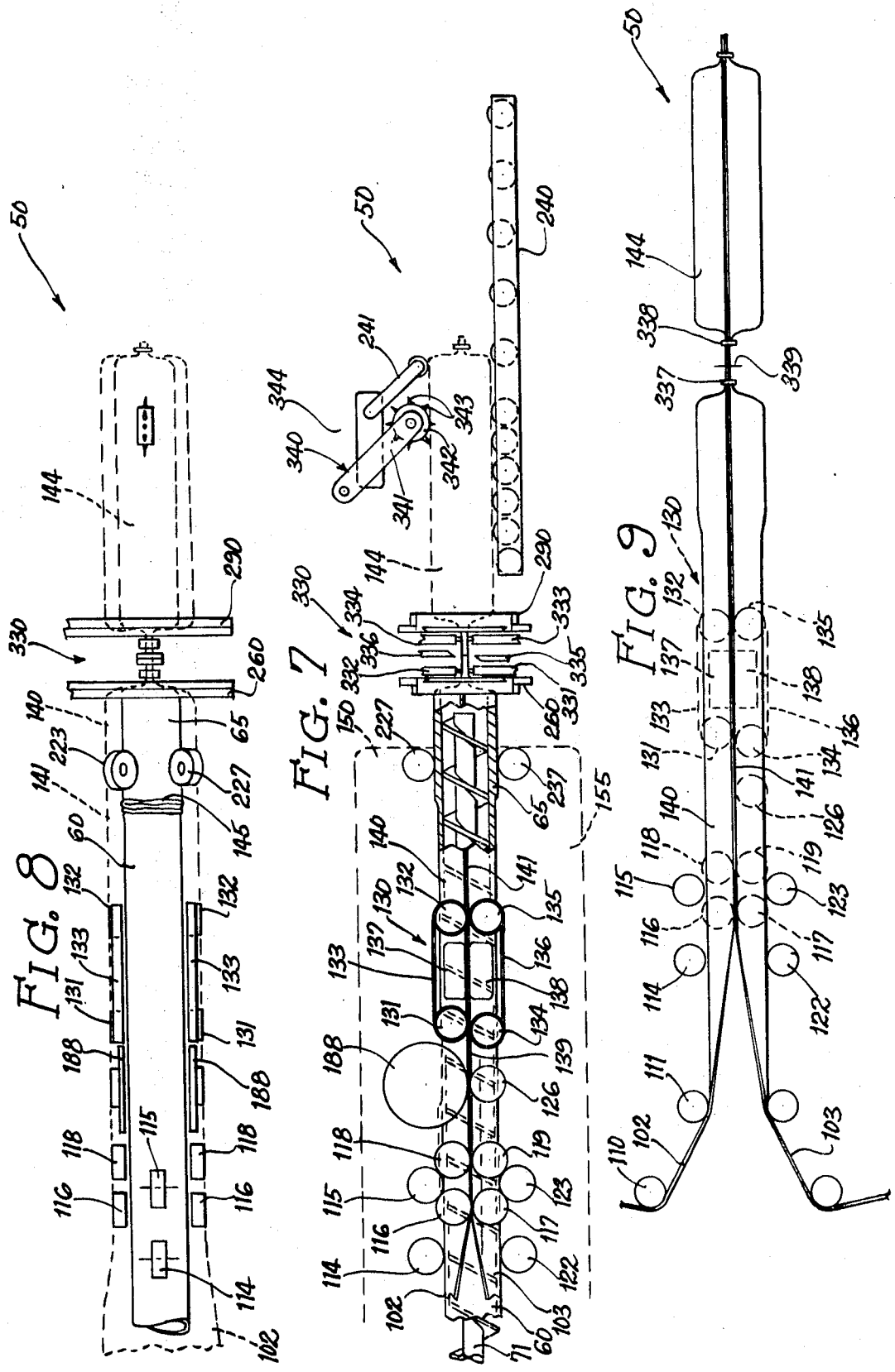

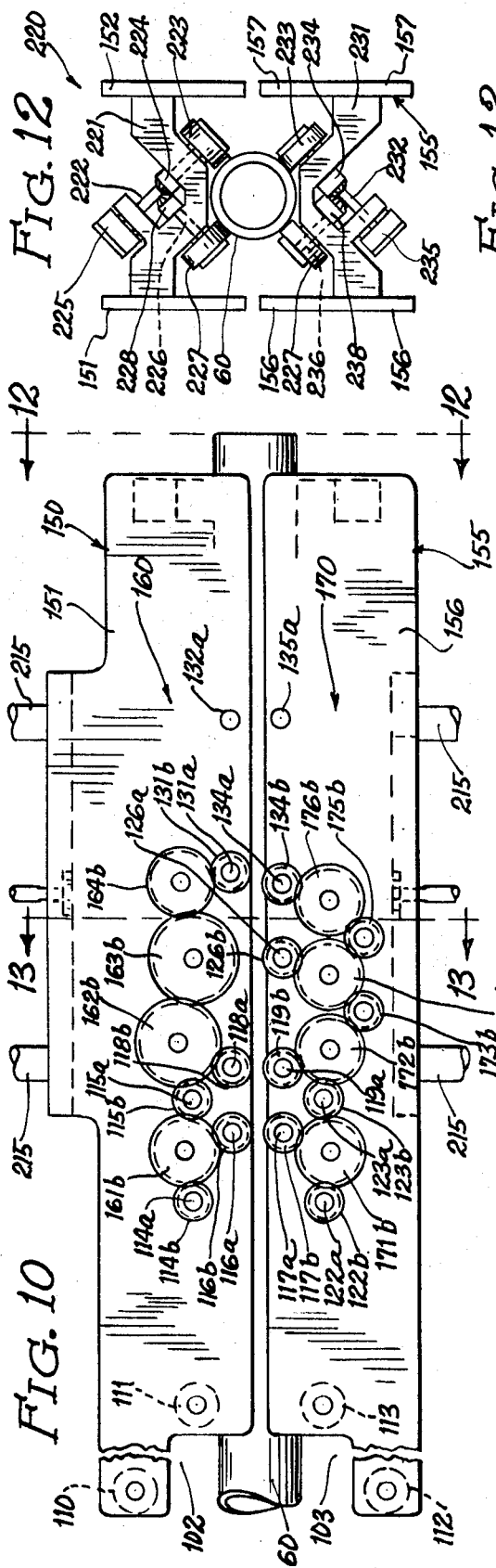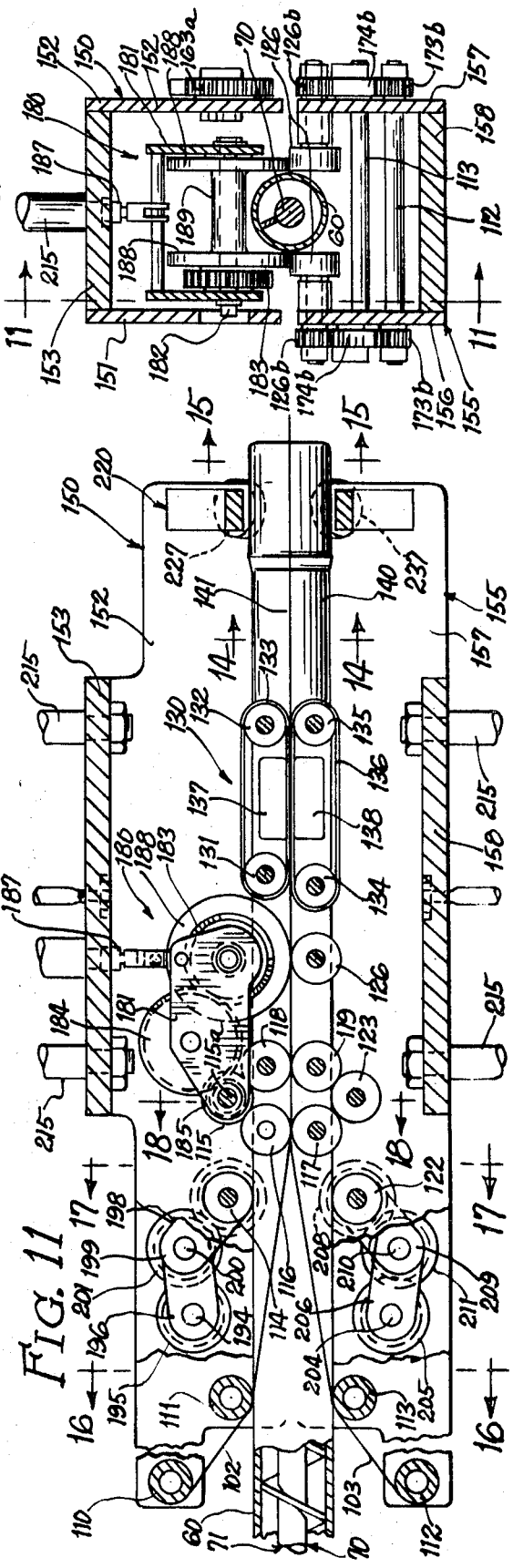

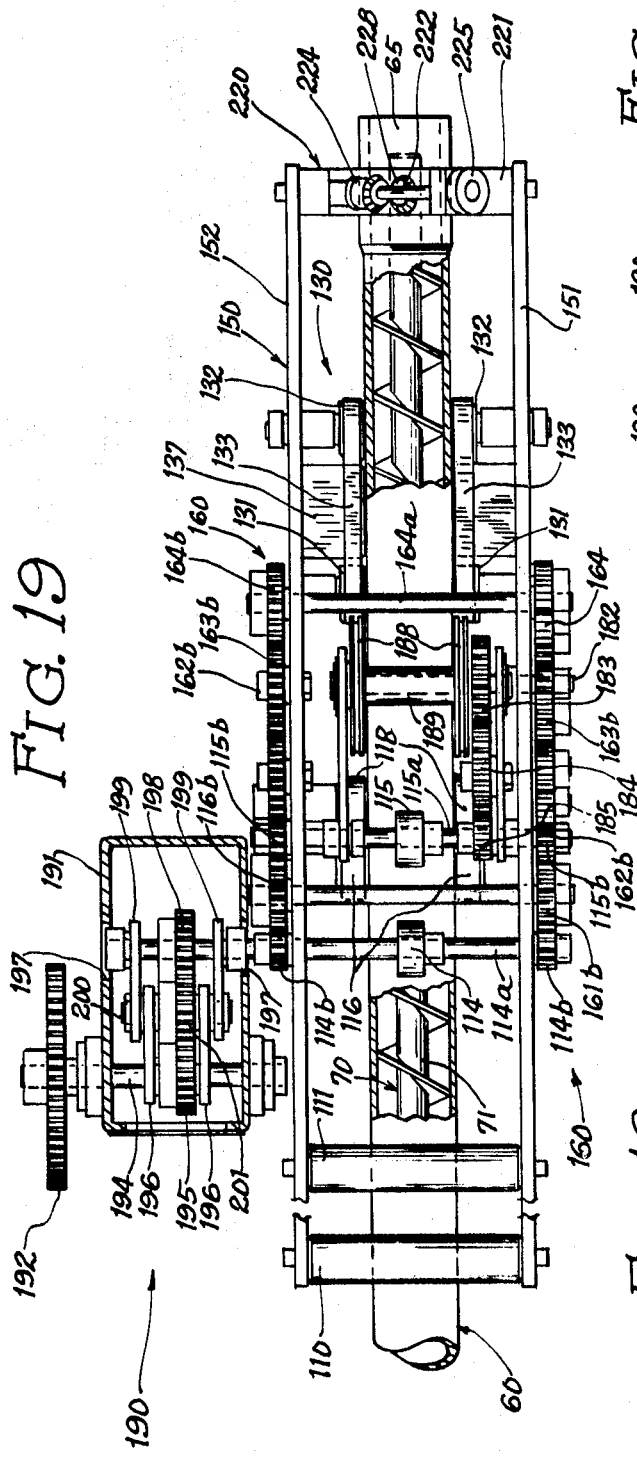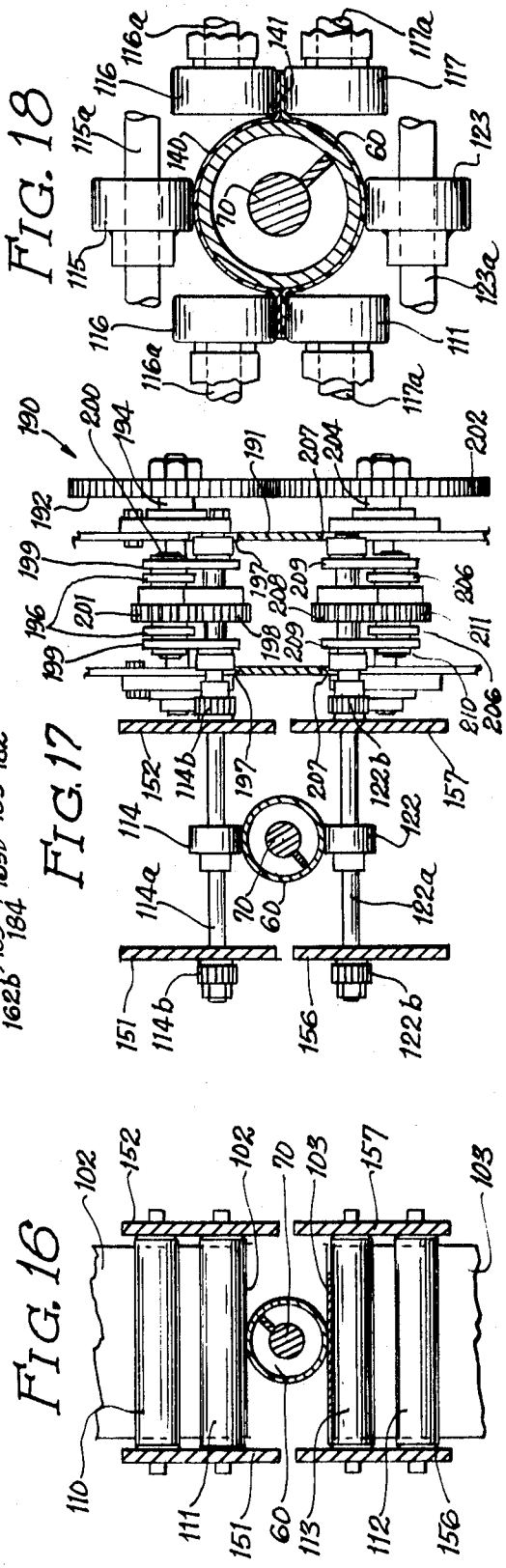

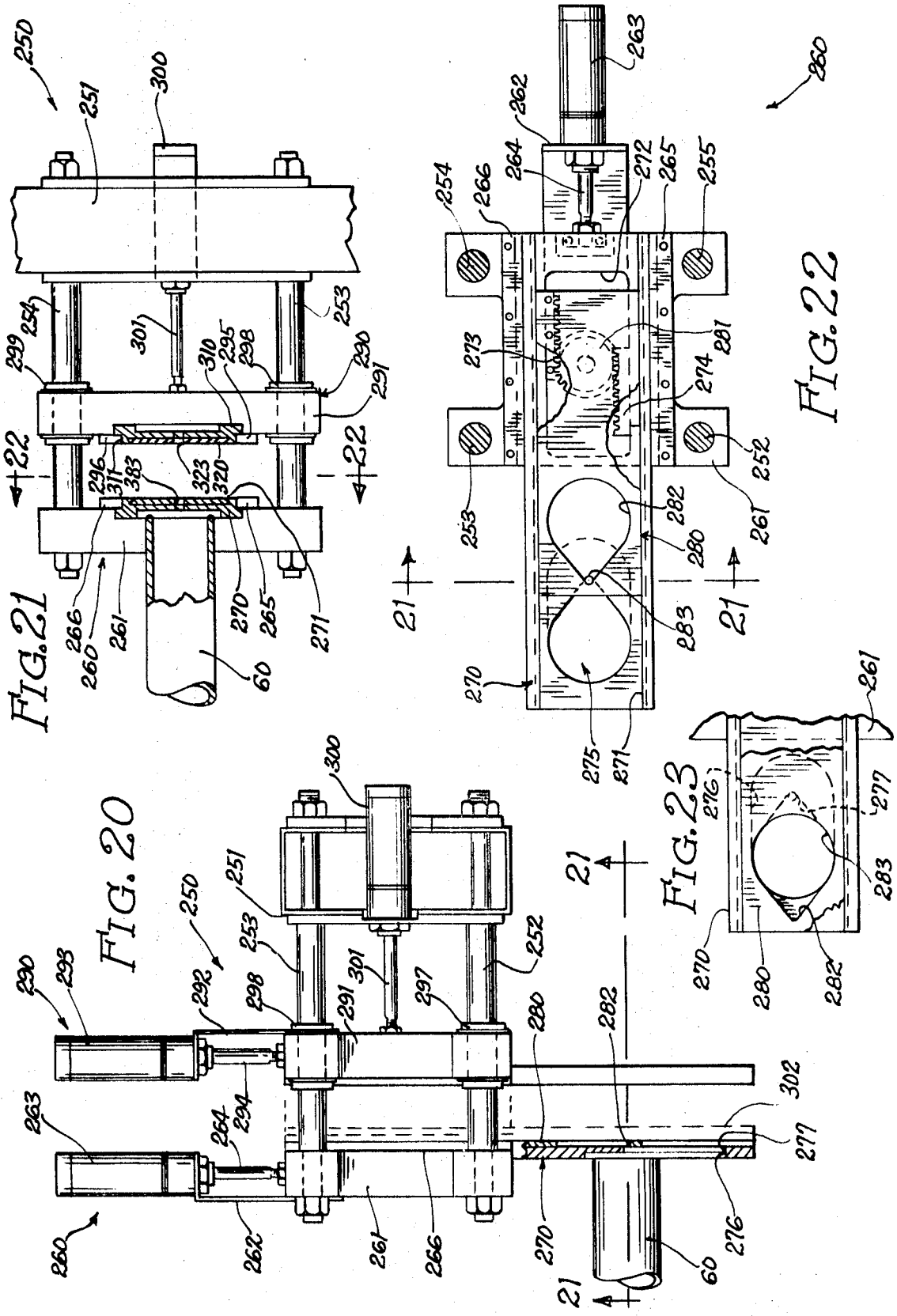

United States Patent Office 3,606,726
Patented Sept. 21, 1971

3,606,726
METHOD AND MACHINE FOR MAKING DUNNAGE DEVICES
Maurice Spertus, Highland Park, and Charles K. Goldberg, Chicago, Ill., assignors to Intercraft Industries Corporation, Chicago, Ill.
Filed Aug. 7, 1969, Ser. No. 848,150
Int. Cl. B65b 9/12, 13/20
U.S. Cl. 53—28                                                   15 Claims

ABSTRACT OF THE DISCLOSURE

There is disclosed a machine and a method for utilizing waste paper products and the like by stuffing the same into a flexible tubing to form perforated dunnage links. The dunnage links are used separately or joined together to form a mat. The dunnage links are made, one after another, by transporting flexible tubing while encircling a hollow mandrel and simultaneously transporting the waste products through the mandrel and into the tubing. After a predetermined length of filled tubing is formed, it is sealed and severed.

BACKGROUND OF THE INVENTION

In the past, waste materials, such as paper products, wood products, fabrics, etc., were discarded or burned to get rid of them. It has been learned that in certain instances these materials may be used to make dunnage so as to save the expense of having either to burn them or have them picked up. The dunnage so formed may be used as a shock absorber for packing fragile or breakable objects.

It is therefore an important object of this invention to provide a method whereby waste materials, such as paper products, wood products and fabrics, can be used to make dunnage devices.

Another object of this invention is to provide dunnage links in the shape of sausages and stuffed with comminuted material, for use separately or connected together in the form of a dunnage mat.

A further object is to provide dunnage links filled with comminuted material, which links are perforated to accommodate expansion and contraction thereof so as to increase the ability of the links to function as shock absorbers.

Yet anothre object is to provide a method and a machine that will automatically make dunnage links, one after another.

Still a further object is to form dunnage links automatically from two continuous strips of thin flexible film and waste materials, such as paper products, wood products, fabrics, and the like.

Still another object is to provide a method and a machine for making dunnage links filled with comminuted material of a selected density.

With the foregoing and other objects in view which will appear as the description proceeds, the invention consists of certain novel features of construction, arrangement, and a combination of parts hereinafter fully described, illustrated in the accompanying drawings and particularly pointed out in the appended claims, it being understood that various changes in the form, proportions, size, and minor details of the structure and the method may be made without departing from the spirit or sacrificing any of the advantages of the invention.

BRIEF DESCRIPTION OF THE DRAWINGS

For the purpose of facilitating an understanding of the invention, there have been illustrated in the accompanying drawings preferred embodiments thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perforated dunnage link embodying therein certain of the principles of the present invention;

FIG. 2 is a plan view of several dunnage links having the necks and lips thereof interconnected to form a dunnage mat, several of the links having been shown in fragmentary form;

FIG. 3 is a sectional view taken on the plane of line 3—3 of FIG. 2 of the drawings and viewed in the direction indicated;

FIG. 4 is a side elevational view of the rear portion of the machine used to make dunnage links like that shown in FIG. 1, one after another;

FIG. 5 is a sectional view on an enlarged scale of the feed screw unit in FIG. 4, taken along the plane of line 5—5 thereof and viewed in the direction indicated;

FIG. 6 is a fragmentary top plan view of the clamp used on the feed-screw unit of FIG. 4;

FIG. 7 is a side elevational view of the forward portion of the machine used to make the dunnage link shown in FIG. 1;

FIG. 8 is a top plan view of the forward portion of the dunnage-making machine of FIG. 7;

FIG. 9 is a schematic view of the progression of two thin flexible film strips as they are brought together to form a flexible tubing;

FIG. 10 is a side elevational view of a portion of the dunnage-making machine, particularly showing the supporting frame and the roller drive train;

FIG. 11 is a cross-sectional view like FIG. 10, with portions broken away and with one side of the supporting frame removed to expose the flexible tube-forming mechanism;

FIG. 12 is an end elevational view of a portion of the machine shown in FIG. 10, particularly illustrating the friction-applying unit;

FIG. 13 is a cross-sectional view taken on the plane of the line 13—13 in FIG. 10 of the drawings, particularly illustrating the heat-sealing mechanism;

FIG. 14 is a sectional view taken on the plane of line 14—14 of FIG. 11 of the drawings, viewed in the direction indicated, and showing the flexible tubing encircling the smaller diameter portion of the mandrel;

FIG. 15 is a sectional view taken on the plane of line 15—15 of FIG. 11 of the drawings, viewed in the direction indicated, and showing the flexible tubing encircling the larger diameter portion of the mandrel;

FIG. 16 is a cross-sectional view taken on the plane of line 16—16 of FIG. 11, viewed in the direction indicated and depicting particularly the idler rollers;

FIG. 17 is a cross-sectional view taken on the plane of line 17—17 of FIG. 11 viewed in the direction indicated, and depicting particularly the linkage for driving certain of the tube-forming rollers;

FIG. 18 is a cross-sectional view taken on the plane of line 18—18 of FIG. 11, viewed in the direction indicated and depicting particularly certain of the tube-forming rollers;

FIG. 19 is a view in horizontal cross section of the portion of the dunnage-making machine depicted in FIG. 10, with certain portions of the mandrel being broken away to show the feed screw;

FIG. 20 is a plan view of the gathering mechanism used in the dunnage-making machine;

FIG. 21 is a cross-sectional view of the gathering mechanism of FIG. 20 taken on the plane of line 21—21 of FIG. 20 and viewed in the direction indicated;

FIG. 22 is a front elevational view of one of the gatherers in the gathering mechanism shown in FIG. 20; and FIG. 23 is a front elevational view of the transverse plates in the gatherer of FIG. 22, with the openings in substantially-complete alignment.

DESCRIPTION OF THE PREFERRED EMBODIMENTS

Referring now to the drawings, and more particularly to FIG. 1 thereof, there is shown a dunnage link 30 formed by a pair of strips 31 and 32 of thin flexible material such as polyethylene. The longitudinal margins are joined together, preferably by heat-sealing, to form longitudinally-extending lips 33 and 34. The ends of the dunnage link 30 are gathered together to form necks 35 and 36 which are respectively sealed by staples 37 and 38 or other suitable fasteners. The dunnage link 30 thus formed is generally cylindrical in shape, except, of course, for the lips 33 and 34 and the necks 35 and 36. The dunnage link 30 is filled with comminuted material (not shown) to a specified density and is ferforated by a row of longitudinally-spaced-apart perforations 39.

In use, the dunnage link 30 is placed between objects that are being transported and/or between the objects and the adjacent side of the container or vehicle within which they are disposed. Any number of the dunnage links 30 may be used, depending on the amount of shock absorbency needed, the amount of surface area of the objects, the distance between objects, and the distance between the objects and the container walls. The preforations 39 in the dunnage link 30 permit expansion and contraction thereof arising from jostling of the objects during transportation thereof. In other words, when the object pushes against the dunnage link 30, it will not break but rather will expel some trapped air and at the same time absorb the shock of the movement. The link 30 will draw in air through the perforations 39 when the object returns to its original position.

On the other hand, referring to FIG. 2, the dunnage links 30 may be arranged to form a mat 40, which mat 40 includes a plurality of dunnage links 30 arranged in a side-by-side and end-to-end relationship. The lip 33 of one dunnage link 30 overlaps the lip 34 of the adjacent dunnage link 30, the overlapping lips 33 and 34 being interconnected by means of staples 41, heat welds, or the like. The neck 35 of one dunnage link 30 contacts the neck 36 of the adjacent dunnage link 30, the necks 35 and 36 being interconnected by staples 42, heat welds, or the like. The mat 40 may be placed between, for example, adjacent boxes to be transported and/or between a box and the adjacent wall of the vehicle or container within which the box is located. If desired, considering the space and shock absorbency necessary, two or more such mats 40 may be disposed side by side.

Turning now to FIG. 4, there is shown the rear portion of a machine 50 for making, one after another, the dunnage link 30 shown in FIG. 1. The machine 50 includes a hopper 51 supported by four legs 52 (only two are shown), and, in the embodiment shown, V-shaped in vertical cross section with a rounded base. Placed in the hopper is waste material 53, such as paper products, wood products, fabrics, or the like. Disposed partially in the hopper 51 and extending substantially over the entire longitudinal length thereof is a cylinder 54 having a multiplicity of prongs 55 extending outwardly therefrom. There is provided a shaft 56 extending axially outwardly from the cylinder 54 and to the left as viewed in FIG. 4, the shaft 56 at the outer end thereof carrying a sheave 57 having a V-shaped groove in the periphery thereof. Extending axially outwardly from the cylinder 54 and toward the right is a stub shaft 58. The shafts 56 and 58 are rotatably mounted by means of flanges 59 which are attached to the hopper 51 to accommodate rotational movement of the cylinder 54. The cylinder 54 is so arranged that the prongs 55 extend well within the interior of the hopper 51. Accordingly, rotation of the cylinder 54 functions to agitate the waste material 53 disposed in the hopper 51 to prevent bridging of the material and allow it to gravitate freely.

There is provided a hollow rigid tube or mandrel 60 having a portion thereof disposed in the hopper 51, a small portion extending outwardly from the hopper 51 to the left (as viewed in FIG. 4), and a major portion extending outwardly from the hopper 51 to the right. In the particular construction shown, the mandrel 60 is held in place partially by means of a washer 61 and a collar 62. As is more clearly shown in FIG. 5, the mandrel 60 has approximately the top one-half thereof cut away at 63, so that the interior of the mandrel 60 communicates with the interior of the hopper 51, to permit the comminuted material (hereinafter the waste products may be referred to as comminuted material since it is usually in particle form) to gravitate into the mandrel 60. In order to prevent the comminuted material from dropping below the mandrel 60 or to the sides thereof, the spacing between the mandrel 60 and the hopper 51 may be filled with a substance such as an epoxy 64 or the like. Disposed within the mandrel 60 is an auger or a feed-screw unit 70 having a conveyor portion 71 which commences approximately at the left side (as viewed in FIG. 4) of the hopper 51 and extends toward the right throughout a substantial portion of the mandrel 60, as will be explained in more detail hereinafter. The feed-screw unit 70 also includes a shaft portion 72 which extends toward the left from the left-hand end of the conveyor portion 71. The feed-screw unit 70 has a threaded portion 73 and a square terminus 74 on the left-hand end. There is further provided a hollow rigid tube 75 which is fixed axially, but is rotatably supported at one end thereof by a pillow block 76 and at the other end thereof by a mounting assembly 77 secured to the hopper 51. The shaft portion 72 of the feed-screw unit 70 is disposed within the rigid tube 75 and is axially slidable therein. Disposed adjacent to the left-hand end of the feed-screw 70 is a mounting clamp 80 shown in somewhat greater detail in FIG. 6. The mounting clamp 80 includes a base 81 and side-by-side gripping members 82 and 83, each having a longitudinally-extending bore therethrough. The outer end of the tube 75 is disposed in the bore between the gripping member 83 and the base 81. There is provided a fastener 84 extending through the gripping member 83 and the base 81 and is adapted to be tightened to draw them together. The fastener 84, when tightened, securely holds the mounting clamp 80 on the tube 75. The threaded portion 73 of the feed-screw unit 70 threadably engages a threaded bore between the gripping member 82 and the base 81. There is provided a fastener 85 that extends through the gripping member 82 and the base 81 and is adapted to be tightened to draw the two together. In the loosened condition of the fastener 85, the threaded portion 73 is free to rotate in the threaded bore in the calmp 80. The axial position of the feed-screw unit 70 is selected by grasping the square terminus 74 in order to rotate the same, thereby causing the unit 70 to move axially in the mandrel 60. When the desired axial position of the feed-screw unit 70 is reached (the method of selection will be explained subsequently), the fastener 85 is tightened.

The dunnage-making machine 50 further includes a magnetic clutch mechanism 90 which has a first clutching portion 91 keyed to the tube 75 and a second clutching portion 92 that is free to rotate independently of the tube 75. The clutching portion is keyed to a sheave 93 which has a set of three annular V-shaped grooves. An endless belt 94 is disposed around the V-shaped groove of the sheave 57 and the aligned V-shaped groove of the sheave 93, thus operatively to connect the two sheaves 57 and 93. Disposed around the other two V-shaped grooves in the sheave 93 is a pair of endless belts 95 and 96 respectively disposed around similarly-shaped sheaves on a feed-screw motor (not shown). When the motor is turned on, the sheave 93 is caused to turn, which causes the sheave 57 to turn, to effect rotational movement of the cylinder 54 and thereby agitate the waste material 53 in the hopper 51. When the magnetic clutch mechanism 90 is in its engaged position, that is, when the clutching portions 91 and 92 are engaged, the feed-screw motor also serves to rotate the tube 75. The tube 75 is, of course, operatively connected to the feed-screw unit 70 through the clamp 80, so that the unit 70 is also rotated by the feed-screw motor. In the disengaged condition of the clutch mechanism 90, the feed-screw motor will cause rotation of the clutching portion 92 without rotating the feed-screw unit 70.

When the feed-screw motor is turned on, the agitator, consisting of the cylinder 54 and the prongs 55 mounted thereon, is caused to rotate to agitate the waste material 53 in the hopper 51. The comminuted material thereby formed gravitates onto the conveyor portion 71 of the feed-screw unit 70. The feed-screw motor causes the feed-screw unit 70 to rotate and carry the comminuted material through the mandrel 60 and forwardly (to the right as viewed in FIG. 4).

There is further provided a pair of supply rolls 100 and 101 respectively supplying continuous strips 102 and 103 of plastic packaging material or other thin flexible film. As will be explained, the strips 102 and 103 are used to form a continuous flexible tubing. The strip 102 is led from the roll 100 around a first idler roller 110 and under a second idler roller 111 and onto the top of the mandrel 60. Similarly, the strip 103 is led from the roll 101 and around the idler rollers 112 and 113 and onto the bottom of the mandrel 60.

Referring now more specifically to FIGS. 7 to 9, there is provided a pair of longitudinally-spaced-apart top rollers 114 and 115 that are biased against the top of the mandrel 60. Disposed on one side of the mandrel 60 is a pair of side rollers 116 and 117 biased against each other and a second pair of side rollers 118 and 119 also biased against each other and displaced longitudinally forwardly of the side rollers 116 and 117. Disposed on the other side is a set of four side rollers (only two are shown in FIG. 8) respectively disposed in transverse alignment with the side rollers 116–119. There is provided a pair of bottom rollers 122 and 123 that are biased against the bottom of the mandrel 60 and respectively in vertical alignment with the top rollers 114 and 115. There is also provided a heat roller 188 on each side of the mandrel 60, biased against an associated bearing roller 126. Each heat roller 188 may be of standard construction and is used to heat-seal the material that passes between the rollers 126 and 188.

Disposed forwardly of the rollers 126 and 188 on the sides of the mandrel 60 is a pair of cooling mechanisms 130, each including an upper pair of longitudinally-spaced-apart rollers 131 and 132 with an endless metal cooling band 133 disposed therearound. Also there is a lower pair of longitudinally-spaced-apart rollers 134 and 135 and an endless metal cooling band 136 disposed therearound. The lower flight of the upper band 133 and the upper flight of the lower band 136 are biased against each other and against the material passing therebetween. Two cooling boxes 137 and 138 having cooled water circulated therethrough are respectively in contact with the cooling bands 133 and 136 to cool the same and thereby cool the heated material passing therebetween. The cooling mechanism 130 on the other side of the mandrel 60 includes corresponding rollers, endless bands, and cooling boxes. It is to be understood that each cooling mechanism 130 is of generally-standard construction, whereby further detailed description thereof is believed to be unnecessary.

The strips 102 and 103 of packaging material are held against the top of the mandrel 60 by the action of the rollers 114 and 115 and against the bottom of the mandrel 60 by the rollers 122 and 123. The longitudinal margins of the strips 102 and 103 are brought together and held together on each side of the mandrel 60 by the rollers 116 to 119. The overlapping margins thus created are continuously heat-sealed by the operation of the heat rollers 188 and the associated bearing rollers 126, thus to form a continuous flexible tubing 140 having a longitudinally-extending lip 141 on each side thereof. The tubing 140 passes through the cooling mechanism 130 which cools the heated lips 141. The rollers 114–19, 122, 123, 131, 132, 134, and 135 are all driven as will be explained, so that the strips 102 and 103 are continually drawn from the associated supply rolls 100 and 101 and formed into the continuous tubing 140.

Referring to FIGS. 10 and 19, the details of construction by which certain of the rollers are driven will be described. To support the mechanism that forms the strips 102 and 103 into the continuous flexible tubing 140, there is provided an upper mounting frame 150 having laterally-spaced-apart and longitudinally-extending side walls 151 and 152 and a connecting wall 153; there is also provided a lower mounting frame 155 having longitudinally-extending and laterally-spaced-apart side walls 156 and 157 and a connecting wall 158. Associated with each of the rollers 114–19, 122, 123, 131, 132, 134, and 135 is a shaft (designated by the same reference numeral followed by the letter $a$) and one or more gears on the shaft (designated by the same reference numeral followed by the letter $b$). The top roller 114 has passing therethrough a shaft 114$a$ that is rotatably carried by the side walls 151 and 152 of the upper mounting frame 150. The shaft 114$a$ extends into and engages a roller drive mechanism 190, the details of which will be explained hereinafter. The shaft 114$a$ carries at spaced-apart points thereon two driver gears 114$b$, disposed respectively adjacent to the outside of the side walls 151 and 152. The gears 114$b$ are part of a train 160 that also includes two idler gears 161$b$ respectively meshing with the driver gears 114$b$. Referring also to FIG. 18, the top rollers 115 are respectively carried by shafts 115$a$ which are rotatably mounted respectively on the side walls 151 and 152 and which carry a pair of gears 115$b$. Similarly, the side rollers 116 are respectively carried by shafts 116$a$ which are rotatably mounted respectively on the side walls 151 and 152 and which carry a pair of gears 116$b$. The gears 115$b$ and 116$b$ on one side of the frame 150 mesh with the adjacent one of the idler gears 161$b$, and the gears 115$b$ and 116$b$ on the other side mesh with the other idler gear 161$b$. The drive train 160 further includes a pair of idler gears 162$b$ that respectively mesh with the driven gears 115$b$; a pair of idler gears 163$b$ that respectively mesh with the idler gears 162$b$; and a pair of idler gears 164$b$ that respectively mesh with the idler gears 163$b$. Also, the side rollers 118 on each side of the mandrel 60 are respectively mounted on shafts 118$a$ on the upper mounting frame 150 respectively carrying driven gears 118$b$ thereon that mesh with the idler gears 162$b$. Finally, the rollers 131 on each side of the mandrel 60 are respectively mounted on shafts 131$a$ on the upper mounting frame 150 respectively carrying driven gears 131$b$ thereon that mesh with the idler gears 164$b$. Accordingly, rotation of the shaft 114$a$ causes the driver gears 114$b$ to rotate, which, in turn, rotate the idler gears 161$b$, in turn, imparting rotation to the driven gears 115$b$ and 116$b$. The driven gears 115$b$ rotate the idler gears 162$b$ which impart rotation to the driven gears 118$b$ and rotate the driven gears 131$b$ through the idler gears 163$b$ and 164$b$.

In a generally-similar fashion, there is provided a drive train 170 for the rollers carried by the lower mounting frame 155. The drive train 170 includes a pair of driver gears 122$b$ and pairs of driven gears 117$b$, 119$b$, 123$b$, 126$b$, and 134$b$, the pairs of gears being respectively mounted on shafts (labeled by the same reference numeral followed by the letter $a$) carried by the associated rollers.

The drive train 170 also includes pairs of idler gears 171b, 172b, 173b, 174b, 175b, and 176b that mesh with the driver and driven gears as shown for transmitting rotation therebetween. The shaft 122a supporting the driver gear 122b is driven by the mechanism 190, as will be explained subsequently, whereby the driver gears 122b impart rotation to the idler gears 171b which, in turn, rotate driven gears 117b and 123b. Driven gears 123b impart rotation to idler gears 172b which, in turn, impart rotation to driven gears 119b and idler gears 173b, causing driven gears 126b and idler gears 175b to rotate through the action of idler gears 174b. Driven gears 134b are rotated by the motion transmitted through the idler gears 175b and 176b.

Referring particularly to FIGS. 11 and 13, there is further provided a heating assembly 180 which includes a frame 181 and a shaft 182 carried thereby. The shaft 182 rotatably supports a driven gear 183 that meshes with an idler gear 184, which, in turn, meshes with a driver gear 185 carried by the shaft 115a. There is provided a pair of laterally-spaced-apart heat rollers 188 disposed on either side of the mandrel 60 and joined by a tubular connecting portion 189 through which passes the shaft 182. The heat rollers 188 are respectively in contact with the bearing rollers 126. Rotation of the shaft 114a imparts rotation through the drive train 160 and through the driver gear 185, the idler gear 184, and the driven gear 183, to rotate the heat rollers 188. The shaft 115a serves as a pivot axis for the frame 181, its maximum clockwise position occurring when the heat rollers 188 engage the associated bearing rollers 126. The frame 181 is connected to the piston 187 of a fluid cylinder (not shown) which, when filled with air, forces the heat rollers 188 against the bearing rollers 126. The piston 187 is spring-mounted to pivot the heating assembly 180 including the heat rollers 188 away from the associated bearing rollers 126. Means (not shown) are provided that sense rotation of the driver gear 185 and, if same is not rotating, cause release of the air pressure in the cylinder. Then, the spring-loading takes over and pivots the heating assembly 180 counterclockwise about the shaft 115a to separate the heat rollers 188 from their associated bearing rollers 126. It is to be understood that the tubing 140 is continuously being formed and therefore it is contemplated that the rollers 188 and 126 are normally in engagement. However, if rotation of the rollers is interrupted, the structure just described will prevent damage to the tubing 140 and/or the machine 50 itself.

The roller drive mechanism 190 is shown particularly in FIGS. 17 and 19 and includes housing 191. There is provided a pair of meshing driven gears 192 and 202 disposed outside of the housing 191 and rotatably supported thereby. The driven gear 202 meshes with a driver gear (not shown) on a roller drive motor (not shown), which motor is separate and apart from the feed-screw motor that is used to drive the feed-screw unit 70. The driven gear 192 is supported by a shaft 194 that extends through the housing 191 and is rotatably carried thereby. The shaft 194 carries a driver gear 195 and a pair of links 196 disposed on either side of the gear 195. A portion of the shaft 114a extends through vertically-disposed and laterally-aligned slots 197 in the housing 191. The shaft 114a carries thereon a driven gear 198 and a pair of links 199 on either side of the gear 198. The roller drive mechanism 190 also includes a shaft 200 carrying an idler gear 201 that meshes with the driver gear 195 and the driven gear 198.

Similarly, the driven gear 202 is rotatably mounted on a shaft 204 that extends through the housing 191 and is rotatable thereon. The shaft 204 carries a driven gear 205 (FIG. 11) and a pair of links 206 disposed on either side of the gear 205. The shaft 122a extends through vertically-disposed and laterally-aligned slots 207 in the housing 191. The shaft 122a carries thereon a driven gear 208 and a pair of links 209 on either side of the gear 208.

The roller drive mechanism 190 also includes a shaft 210 carrying an idler gear 211 that meshes with the driver gear 205 and the driven gear 208. It can be seen that, if the mounting frames 150 and 155 are moved vertically, the shafts 114a and 122a will respectively ride vertically in the slots 197 and 207, but, by virtue of the links 196 and 199, the gears 195, 198, and 201 will remain in engagement throughout the movement of the upper mounting frame 150; and by virtue of the links 206 and 209, the gears 205, 208, and 211 will remain in engagement throughout the movement of the frame 155.

The advantage in the above-described construction can readily be appreciated by noting that the frames 150 and 155 have rods 215 projecting therefrom. The main stand (not shown) for the machine 50 includes bushings through which the rods are reciprocable to accommodate vertical movement of the frames 150 and 155. In their spread-apart position, the user can gain access to the mandrel 60. In other words, when the dunnage-making machine 50 is being set up, it is necessary that the frames 150 and 155 be displaced from the mandrel 60 so as to position the strips 102 and 103 of plastic material in the proper location thereon. The roller-drive mechanism 190 just described accommodates such movement of the frames 150 and 155 and the apparatus mounted thereon without disengaging the drive.

In operation, after the strips 102 and 103 of plastic material are positioned on the mandrel 60 and the frames 150 and 155 are brought together, the dunnage-making machine 50 is ready for operation. The roller-drive motor (not shown) is energized, thus imparting rotation to the driven gear 202 which imparts rotation through the gears 211 and 208 to the shaft 122a which causes operation of the drive train 170 in the manner previously described. Similarly, the driven gear 192 imparts rotation to the shaft 114a through the drive train consisting of gears 195, 201, and 198. Rotation of the shaft 114a causes operation of the drive train 160 in the manner previously described.

As the flexible tubing leaves the cooling mechanism 130, it has the appearance shown in FIG. 14 and has small gaps 142 adjacent to the lips 141. In order to remove these gaps, the right-hand end portion 65 of the mandrel 60 is slightly increased in diameter. When the tubing 140 traverses the portion 65, its diameter will be expanded to remove the gaps 142 to have the appearance shown in FIG. 15.

Referring now to FIGS. 12 and 19, there is shown a friction-applying mechanism 220 including a support 221 connected to the side walls 151 and 152 of the upper mounting frame 150. A shaft 222 extends through the support 221 and carries a roller 223 that engages the mandrel 60. The shaft also carries a bevel gear 224 and a variable magnetic brake 225. Also carried by the support 221 is a second shaft 226 which carries a second roller 227 that contacts the mandrel 60 at a point spaced 90° from the roller 223. The shaft 226 also carries a bevel gear 228 that meshes with the bevel gear 224. By varying the torque exerted by the magnetic brake 225, the restraining force exerted by the rollers 223 and 227 on the tubing 140 may be varied. The friction-applying mechanism 220 also includes a support 231 connected to the side walls 156 and 157 of the lower mounting frame 155. A shaft 232 extends through the support 231 and carries a roller 233 that engages the mandrel 60 at a point thereon placed 90° from the point where the roller 223 engages the mandrel 60. The shaft carries a bevel gear 234 and a variable magnetic brake 235. Also carried by the support 231 is a second shaft 236 which carries a second roller 237 that contacts the mandrel 60 at a point spaced 90° from the roller 233 and 90° from the roller 227. The shaft 236 also carries a bevel gear 238 that meshes with the bevel gear 234. By varying the torque exerted by the magnetic brake 235, the restraining force exerted by the rollers 233 and 237 on the tubing 140 may be varied.

In operation, as the tubing 140 is formed and transported along the mandrel 60, it is being filled with comminuted material transported from the hopper 51 by the feed-screw unit 70. The fact that the tube-forming rollers 114–19, 122, and 123, the heat-sealing rollers and their associated bearing rollers 126, and the bands 133 and 136 are all driven and the fact that the comminuted material is being forced into the tubing 140 both contribute to its forward movement (to the right as viewed in FIGS. 4 and 5). The friction-applying mechanism 220 restrains forward movement of the tubing 140. By varying the force that it applies by adjusting the magnetic brakes 225 and 235, the density of the comminuted material in the filled tubing 144 can be selected. The density or compactness of the filled tubing 144 may also be selected by adjusting the speed of the feed-screw unit 70 by, for example, using a variable speed feed-screw motor (not shown). The density may further be adjusted by controlling the speed at which the tubing 140 is being formed, as for example, by using a variable speed roller drive motor (not shown) to vary the speed of the rollers. Further, the density or compactness of the comminuted material in the filled tubing 144 may be selected by varying the distance between the forward end of the feed-screw unit 70 and the forward end of the mandrel 60; the greater the distance, the more compact or dense the comminuted material is. This distance is adjustable by first loosening the fastener 85 (see FIGS. 4 and 6) on the clamp 80 as previously described and moving the feed-screw unit 70 in the desired direction, followed by tightening of the fastener 85.

Referring to FIGS. 20 to 23, the construction and operation of the gathering mechanism 250 will now be described. The gathering mechanism 250 includes an essentially-square base 251 which is attached to the stand (not shown) upon which the rest of the dunnage-making machine 50 is mounted. The base 251 carries four annular slide rails 252, 253, 254, and 255. Fixedly mounted on the rails 252 to 255 is a stationary gatherer 260 including a frame 261 which carries a bracket 262. An air cylinder 263 is mounted on the bracket 262, the air cylinder 263 including a projecting piston 264. Mounted on the forward side of the frame 261 are two vertically spaced-apart and parallelly-extending guides 265 and 266.

The stationary gatherer 260 also includes an elongated, generally-rectangular plate 270 disposed between the guides 265 and 266 so as to be slidable with respect to the frame 261. The plate 270 has a dovetail-shaped channel 271 on the forward side thereof and extending across its entire lateral extent. The plate 270 also has adjacent to one end thereof a rectangular-shaped opening 272 therein. Mounted on the plate 270 in the opening 272 at the top thereof is a rack 273 and at the bottom thereof a rack 274. Finally, the plate 270 includes a complex opening 275 which has a generally-oval-shaped opening 276 at the rear and a teardrop-shaped opening 277 at the front, with the point of the teardrop-shaped portion being directed toward the opening 272. The end of the plate adjacent to the rectangular opening 272 is attached to the piston 264. The stationary gatherer 260 also includes a second elongated rectangular-shaped plate 280 carrying a pinion gear 281 near one end thereof and a teardrop-shaped opening 282 near the other end thereof; the point on the teardrop-shaped opening is directed away from the pinion gear 281. The sides of the plate 280 are beveled outwardly so as to fit within the dovetail-shaped channel 271 and slidable therein. The pinion gear 281 meshes with the racks 273 and 274 as shown. The through opening 283, that is, the opening passing through both plates 270 and 280, has a minimum diameter in the condition of the gatherer 260 shown in FIG. 22 because essentially only the points of the teardrop-shaped openings 277 and 282 are longitudinally aligned. The base 251 is mounted on the main stand (not shown) on which the rest of the dunnage-making machine 50 is mounted, in such a manner that the longitudinal axis of the mandrel 60 is aligned with the through opening 283 (the opening passing through both plates 270 and 280).

By admitting air into one end of the cylinder 263, the plate 270 will move laterally in one direction, for example, to the right (as viewed in FIG. 22). The racks 273 and 274 transmit this motion via the pinion gear 281 to the plate 280 and cause the same to move in the opposite direction, for example, to the left (as viewed in FIG. 22). The plates 270 and 280 will move with respect to each other until the openings 277 and 282 are in the position shown in FIG. 23, i.e., the through opening 283 (the opening passing through both plates) has a maximum diameter and is large enough to accommodate passage of the filled tubing 144 therethrough. By passing air into the cylinder 263, the plates 270 and 280 move respectively to the left and to the right until they are again in the position shown in FIG. 22, that is: the diameter of the through opening 283 is a minimum. Because of the rack and pinion arrangement on the gatherer 260, the plates 270 and 280 move by equal amounts in opposite directions, so that the axis of the mandrel 60 passes through the center of the through opening 283 whether it has its smallest size as shown in FIG. 22 or has its largest size as shown in FIG. 23.

Axially movably mounted on the rails 252 to 255 is a movable gatherer 290 including a frame 291 which carries a bracket 292. An air cylinder 293 is mounted on the bracket 292, the air cylinder 293 including a projecting piston 294. The frame 291 is generally square-shaped and has a set of four bushings 297, 298, 299 (the fourth is not shown) which respectively slidably receive slide rails 252 to 255, so that the gatherer 290 is axially movable. Mounted on the base 251 is an air cylinder 300 which includes a piston 301 connected to the frame 291 of the axially-movable gatherer 290. By passing air into the cylinder 300, the gatherer 290 moves parallel to the axis of the mandrel 60 in one direction, for example, to the left (as viewed in FIG. 20) toward the stationary gatherer 260 to a position where the gatherers 260 and 290 are in juxtaposition, the gatherer 290 in this position being indicated by the phantom 302. By passing air into the cylinder 300, the gatherer 290 will move in the other direction, for example, to the right (as viewed in FIG. 20).

The movable gatherer 290 also includes laterally-reciprocable plates 310 and 320 respectively similar in construction to the plates 270 and 280 in the stationary gatherer 260 (as shown in FIG. 22). The plates 310 and 320 include similarly-shaped openings and the rack and pinion construction. All of the parts of the plates 310 and 320 are not shown, but those that are shown are labeled with corresponding reference numerals with a factor of 40 added thereto.

The cylinders 263 and 293 are concurrently operated by air hoses (not shown) connected thereto in such a manner that the through opening 283 in the gatherer 260 and the corresponding through opening 323 in the gatherer 290 are the same size, that is, either both small or both large.

Referring to FIGS. 7 and 8, the gathering mechanism 250 is disposed adjacent to the front end of the mandrel 60. In front of the gathering mechanism 250 there is disposed an exit conveyor 240 that transports the completed dunnage links to an output bin (not shown). While the feed-screw unit 70 is operating, the axially-movable gatherer 290 is in its closed position as indicated by the phantom line 302, and the diameter of each of the through openings 283 and 323 of the gatherers is at a maximum. In that condition, the tubing 140, as it is being filled with comminuted material by the feed-screw unit 70, passes through the enlarged through openings 283 and 323 and onto the conveyor 240, the filled tubing 144 being shown in phantom.

There is provided a limit switch 241 which is placed at a predetermined axial position along the longitudinal extent of the conveyor 240. The limit switch 241 is electrically connected to the magnetic clutch mechanism 90 (see FIG. 4) and has, in the embodiment shown, a lowered position to cause engagement of the magnetic clutch mechanism 90 to permit the feed-screw motor to drive the feed-screw unit 70 and fill the tubing 140 with comminuted material; and a raised position to cause the magnetic clutch mechanism 90 to disengage, so that, despite continued operation of the feed-screw motor, operation of the feed-screw unit 70 is interrupted to discontinue filling of the tubing 140. The axial position of the limit switch 241 with respect to the gathering mechanism 250 will determine when the feed-screw unit 70 stops rotating to cease filling of the tubing 140, and thus determine the length of the finished dunnage link. Even though the filling of the tubing 140 stops, the driven rollers continue to form the empty tubing 140, so that the tubing shirrs up at 145 (see FIG. 8) against the rollers 223, 227, 233, and 237 of the friction-applying mechanism 220.

The air cylinders 263, 293, and 300 may be operated, for example, by electric solenoid valves electrically coupled to the limit switch 241. The raising of the switch 241 by the filled tubing 144, in addition to interrupting the feed-screw unit 70, therefore also sets in motion the gathering mechanism 250. When the filled tubing 144 strikes the limit switch 241, air is let into the cylinders 263 and 293 (or out of the cylinders, depending on the particular construction thereof) to cause the plates 270 and 280 of the gatherer 260 to move in opposite directions like a shutter until the through opening 283 reaches its smallest size, that depicted in FIGS. 21 and 22; and to cause the plates 310 and 320 of the gatherer 290 to move in opposite directions like a shutter until the through opening 323 reaches its smallest size, that depicted in FIG. 21. The operation thus described causes the empty tubing 140 that trails the filled tubing 144 to become gathered at two adjacent regions thereon.

As soon as the through openings 283 and 323 have reached their smallest sizes, air is admitted into one side of the cylinder 300, to draw the axially-movable gatherer 290 forwardly and away from the stationary gatherer 260. This utilizes the shirred-up tubing 145 disposed rearwardly of the friction-applying mechanism 220 by expanding the same to increase the length of gathered empty tubing 140. At this point, a sealing and severing mechanism 330 is actuated.

The sealing and severing mechanism 330 may have components that are of generally-standard construction and is therefore shown schematically in FIGS. 7 and 8. The mechanism 330 includes a first sealing unit consisting of a vertically-movable anvil 331 and a vertically-movable head 332 in vertical alignment therewith. Disposed forwardly is a second sealing unit consisting of a vertically-movable anvil 333 and a vertically-movable head 334 vertically aligned therewith. There is further provided a pair of vertically-aligned and vertically-movable shear blades 335 and 336 disposed longitudinally axially between the two sealing units. The sealing and severing mechanism 330 is mounted on the stand (not shown) on which the rest of the dunnage-making machine 50 is mounted in such a manner that the anvils 331 and 333, the heads 332 and 334, and the shear blades 335 and 336 are held in a retracted position, by tension springs or the like, radially away from the longitudinal axis of the mandrel 60.

There is provided means (not shown) responsive to the completion of the forward movement of the gatherer 290 with respect to the gatherer 260 to actuate the stitching units by causing the anvils 331 and 333 to move upwardly and immediately beneath the increased length of empty tubing 140 at axially-spaced-apart points thereof. The heads 332 and 334 respectively carry staples or the like and also simultaneously move toward the same spaced points and forcibly against the respective anvils 331 and 333 to form staples 337 and 338 (See FIG. 9) around the empty tubing 140. Accordingly, the anvil 333 and the head 334 operate to seal the trailing end of the filled tubing 144, and the anvil 331 and the head 332 operate to seal the leading end of the next length of empty tubing 140.

Further means (not shown) are provided responsive to the completion of the sealing operation to actuate the shear blades 335 and 336 to sever the empty tubing at a point 339 between the staples 337 and 338, whereby a completed dunnage link, such as the dunnage link 30 shown in FIG. 1, is formed. When the severing operation is completed, the sealing and severing mechanism 330, including the anvils 331 and 333, the heads 332 and 334, and the blades 335 and 336, are retracted to a position so as not to interfere with axial movement of the gatherers 290. The through openings 283 and 323 of the gatherers 260 and 290 again open to their maximum sizes, and the gatherer 290 moves rearwardly until it is in juxtaposition with the gatherer 260. The magnetic clutch mechanism 90 responds to the return of the gatherer 290 to re-engage the clutching portions 91 and 92 so as again to commence rotation of the feed-screw unit 70 which commences to fill the empty tubing 140 with comminuted material.

Disposed above the exit conveyor 240 is a perforating mechanism 340 including an arm 341 pivoted at one end to the main stand (not shown) for the machine 50 and carrying at the other end a wheel 342. The wheel 342 carries evenly-spaced prongs 343 around the periphery thereof directed radially outwardly. The arm 341 is biased clockwise as schematically indicated by the spring 344, so that the wheel 342 bears against the filled tubing 144 carried by the exit conveyor 240. The prongs 343 perforate the filled tubing 144 as it moves along the conveyor 240, thus to form the perforated dunnage link 30 shown in FIG. 1.

Summarizing the operation of the dunnage-making machine 50, when the feed-screw motor is turned on, the prongs 55 agitate the waste material 53 in the hopper 51 to cause the comminuted material to fall freely into the mandrel 60. The feed-screw motor causes the feed-screw unit 70 to rotate and carry the comminuted material forwardly through the mandrel 60. The strips 102 and 103 of flexible film are positioned on the mandrel, formed into a tubular shape and transported along the mandrel 60 by the rollers 110–19, 122, and 123. The longitudinally-extending lips 141 thus created are heat-sealed by the action of heat rollers 188 and their associated bearing rollers 126. The heated lips 141 are cooled by virtue of their passing between the cooling bands 133 and 136 of the cooling mechanism 130. The diameter of the thus formed flexible tubing 140 is increased by traversing the increased diameter portion 65 of the mandrel 60. The friction-applying mechanism 220 causes the flexible tubing 140 to shirr up and is adjusted to provide the desired density or compactness of the comminuted material in the filled tubing 144.

The filled tubing 144 passes through the enlarged through openings 283 and 323 respectively of the gatherers 260 and 290 which are now in an axially-closed position, and onto the exit conveyor 240. The filled tubing 144 strikes the limit switch 241 which interrupts operation of the feed-screw unit 70 to disrupt filling of the tubing 140 and cause the through openings 283 and 323 respectively in the gatherers 260 and 290 to decrease in size, whereupon the gatherer 290 moves axially forwardly and away from the gatherer 260. The stitching unit, consisting of the anvils 331 and 333 and the heads 332 and 334, moves radially toward the increased length of empty tubing between the gatherers 260 and 290 to place the staples 337 and 338 as shown. The blades 335 and 336 then sever the gathered empty tubing to form a completed dunnage link. While the filled tubing 144 is moving on the exit conveyor 240, it is being perforated by the perforating mechanism 340.

After severance is completed, the entire sealing and severing mechanism 330 is retracted, the through openings 283 and 323 and the gatherers 260 and 290 are enlarged, and the gatherer 290 moves toward the gatherer 260, whereupon the feed-screw unit 70 again begins to operate. The above-described operation is continually performed and repeated, so that dunnage links, like the dunnage link 30 shown in FIG. 1, are formed, one after another.

It is believed that the invention, its mode of operation, construction, and assembly and many of its advantages should be readily understood from the foregoing without further description. It should also be manifest that, while a preferred embodiment of a machine has been shown and described for illustrative purposes, the novel method performed thereby and its structural and operational details are, nevertheless, capable of wide variation within the purview of the invention as defined in the appended claims.

What I claim and desire to procure by Letters Patent of the United States is:

1. A method of making dunnage links one after another from flexible tubing, said method comprising:
   transporting the tubing along its longitudinal axis;
   sealing the leading end of the tubing;
   filling the tubing with comminuted material until a predetermined length of filled tubing is made;
   sealing and severing the empty tubing that trails the filled tubing;
   perforating said dunnage link to facilitate expansion and contraction thereof in use; and
   continually repeating the last-mentioned three steps to form dunnage links one after another.

2. A method of making dunnage links one after another from flexible tubing, said method comprising:
   transporting the tubing along its longitudinal axis;
   sealing the leading end of the tubing;
   filling the tubing with comminuted material until a predetermined length of filled tubing is made;
   gathering two adjacent regions on the empty tubing that trails the filled tubing;
   increasing the length of the gathered empty tubing;
   sealing the increased length of gathered empty tubing at two spaced points thereon;
   severing the increased length of gathered empty tubing between the spaced points thereon; and
   continually repeating the last-mentioned five steps to form dunnage links one after another.

3. A machine for making dunnage links one after another, said machine comprising:
   a hopper for containing comminuted material;
   a hollow tubular mandrel having a rear portion communicating with the interior of said hopper and a front end;
   means for transporting a continuous flexible tubing forwardly while encircling said mandrel;
   means for transporting the comminuted material from the hopper forwardly through said mandrel and into the flexible tubing for filling the same;
   a pair of gatherers disposed forwardly of said front end and operative to gather two adjacent regions on the empty tubing that trails the filled tubing;
   means for axially separating said gatherers to increase the length of the gathered empty tubing;
   a sealing mechanism disposed forwardly of said front end for sealing the increased length of empty tubing at two spaced points thereon; and
   a severing device for severing the increased length of gathered empty tubing between the spaced points thereon to form a dunnage link.

4. The machine set forth in claim 3, wherein:
   the speed at which the flexible tubing is transported on said rigid tube is variable for adjusting the density of the comminuted material in the filled tubing.

5. The machine set forth in claim 3, and further comprising:
   means for placing two continuous strips of flexible film around said mandrel and forming the same into the continuous flexible tubing.

6. The machine set forth in claim 3, wherein:
   said material transporting means includes a feed screw rotatably mounted in said mandrel; and drive means for rotating said feed screw.

7. The machine set forth in claim 6, wherein:
   said feed screw is axially movable in said mandrel to accommodate selection of the distance between the forward end of said feed screw and the forward end of said mandrel for adjusting the density of the comminuted material in the filled tubing.

8. The machine set forth in claim 6, wherein:
   the rotational speed of said feed screw is variable for adjusting the density of the comminuted material in the filled tubing.

9. The machine set forth in claim 3, wherein:
   each of said gatherers has a pair of plates in juxtaposition and transversely movable between first and second positions;
   each of said plates having an opening therein with a diameter exceeding the diameter of said mandrel;
   said plates in said first position having a sufficient portion of the openings therein aligned to accommodate passage of the filled tubing therethrough;
   said plates in said second position having a lesser portion of the openings therein aligned to achieve gathering of the empty tubing.

10. The machine set forth in claim 9, wherein:
    said pair of plates in each of said gatherers are arranged so that the longitudinal axis of said mandrel passes through all of said openings when said plates are in said first position and when said plates are in said second position.

11. The machine set forth in claim 3, wherein:
    the rear one of said pair of gatherers is axially stationary and the front one of said pair of gatherers is axially movable.

12. The machine set forth in claim 3, and further comprising:
    a friction-applying mechanism disposed forwardly of said material transporting means and operative to hold the flexible tubing against said mandrel for restraining forward movement of said flexible tubing.

13. The machine set forth in claim 12, wherein:
    said friction-applying mechanism is adjustable for varying the density of the comminuted material in the filled tubing.

14. The machine set forth in claim 12, and further comprising:
    means for temporarily disrupting the operation of said material transporting means when a predetermined length of tubing is filled;
    whereby the empty tubing shirrs against said friction-applying mechanism and is subsequently used to form the increased length of empty tubing when said gatherers are separated.

15. A machine for making dunnage links one after another, said machine comprising:
    a hopper for containing paper products and the like;
    an agitator for agitating the paper products;
    a hollow tubular mandrel having a rear portion communicating with the interior of said hopper and a front portion;
    means for feeding two continuous strips of heat-sealable material longitudinally along said mandrel on diametrically-opposed surfaces thereof;
    means for sealing said strips together on the sides thereof to form a continuous flexible tubing;
    means for transporting the continuous flexible tubing forwardly while encircling said mandrel;
    means responsive to the interruption of said tubing transporting means to interrupt temporarily the operation of said sealing means;
    means for transporting the paper products from the hopper forwardly through said mandrel and into the flexible tubing for filling the same;

means for sealing and severing the empty tubing that trails the filled tubing so as to form a dunnage link and to seal the leading end of a succeeding length of tubing;

said paper products transporting means alternating with said sealing and severing means for forming dunnage links one after another.

References Cited

UNITED STATES PATENTS

| | | | |
|---|---|---|---|
| 1,546,360 | 7/1925 | Bates | 53—28 |
| 2,006,375 | 7/1935 | Vogt | 53—177X |
| 2,610,134 | 9/1952 | Hoblick | 53—28X |
| 3,020,687 | 2/1962 | Joa | 53—28X |
| 3,214,883 | 11/1965 | Omori | 53—182 |

FOREIGN PATENTS 71,891 2/1960 France _____ 53—29
(1st addition to French Pat. 1,157,061)

TRAVIS S. McGEHEE, Primary Examiner

E. F. DESMOND, Assistant Examiner

U.S. Cl. X.R.

53—124, 180; 93—1